(12) United States Patent
Yin et al.

(10) Patent No.: US 7,899,845 B2
(45) Date of Patent: Mar. 1, 2011

(54) METHODS, APPARATUS AND MEDIA FOR MODIFYING INFORMATION

(75) Inventors: Jianwen Yin, Round Rock, TX (US); RadhaKrishna Reddy Dasari, Round Rock, TX (US); Jon Hass, Austin, TX (US); Javier L. Jimenez, Austin, TX (US); Khachatur Papanyan, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 1133 days.

(21) Appl. No.: 11/563,021

(22) Filed: Nov. 23, 2006

(65) Prior Publication Data

US 2008/0126405 A1 May 29, 2008

(51) Int. Cl.
*G06F 17/30* (2006.01)
(52) U.S. Cl. .................. 707/803; 707/953; 707/955
(58) Field of Classification Search .......... 707/802, 707/999.103, 999.104, 999.105, 999.106, 707/791, 955, 953, 803, 812
See application file for complete search history.

(56) References Cited

U.S. PATENT DOCUMENTS

| | | | |
|---|---|---|---|
| 6,493,719 B1 | 12/2002 | Booth et al. | |
| 6,754,664 B1 | 6/2004 | Bush | |
| 6,976,262 B1 | 12/2005 | Davis et al. | |
| 2002/0107872 A1 | 8/2002 | Hudis et al. | |
| 2003/0004956 A1* | 1/2003 | Johnson et al. | 707/100 |
| 2005/0027850 A1 | 2/2005 | Menzies et al. | |
| 2005/0182843 A1 | 8/2005 | Reistad et al. | |
| 2006/0129974 A1* | 6/2006 | Brendle et al. | 717/108 |
| 2009/0100001 A1* | 4/2009 | Minamino et al. | 707/2 |
| 2009/0125131 A1* | 5/2009 | Eldridge et al. | 700/87 |

\* cited by examiner

*Primary Examiner*—Angela M Lie
(74) *Attorney, Agent, or Firm*—Garrana Tran LLP (57) ABSTRACT

A data structure comprising a first set of data fields wherein each data field contains data representing a managed object of an object-oriented model; a second set of data fields wherein each data field contains data representing an instance of a collection class; a third set of data fields wherein each data field contains data representing an instance of a first association class; a fourth set of data fields wherein each data field contains data representing an instance of a data source class; and a fifth set of data fields wherein each data field contains data representing an instance of a second association class. At least one data field of the first set is associated with a data field of the second set by a data field of the third set, and the data field of the second set is also associated with a data field of the fourth set by a data field of the fifth set. An information handling system readable medium having stored thereon said data structure. Methods for modifying data of the data structure.

14 Claims, 4 Drawing Sheets

```
Class New_UberDataSourceCollection:CIM_ConcreteCollection {
        [Key]
        String InstanceID;
        [Description (
        "This property identified the CIM class name of the instances which are populated by the data sources that are aggregated
in the collection.")]
        String DatasourceClassName;
        [Description (
        "This property defines the criteria used for consolidated the instances of CIM class described in the DataSourceClassName
property."
        ),
        Valuemap ("1", "2", "3"),
        Values ("All", "Priority", "Key")]
        Unit16 Criterion;
        }

Class New_UberDataSource (
        [Key]
        String instanceID;
        [Description (
        "This property identifies the namespace which serves as a data source for the associated Uber instance.")]
        String Namespace;
        [Description (
        "This property identifies the vendor of the provider for the namespace identified in the Namespace property.") ]
        String ProviderVendor;
        [Description (
        "When this property is set to TRUE, the namespace identified in the Namespace property is a trusted data source for the associated
instance")].
        Boolean TrustedDataSource;
        }

[Association]
        Class New_Associated UberDataSources {
                CIM_ManagedElement REF Antecedent;
                New_UberDataSourceCollection REF Dependent;
        }
```

FIG. 4

METHODS, APPARATUS AND MEDIA FOR MODIFYING INFORMATION

BACKGROUND

1. Technical Field

The present disclosure relates to information handling systems and more particularly to object-oriented management information models.

2. Background Information

As the value and use of information continues to increase, individuals and businesses seek additional ways to process and store information. One option available to users is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

The following presents a general summary of some of the many possible embodiments of this disclosure in order to provide a basic understanding of this disclosure. This summary is not an extensive overview of all embodiments of the disclosure. This summary is not intended to identify key or critical elements of the disclosure or to delineate or otherwise limit the scope of the claims. The following summary merely presents some concepts of the disclosure in a general form as a prelude to the more detailed description that follows.

According to one non-limiting embodiment there is provided a method for modifying information, wherein the information describes at least one managed object of an object-oriented model. Generally the method is computer-implemented and comprises the steps of retrieving the information from a cache and modifying the information. The information is organized by at least one instance of the new collection class of the present disclosure which is associated with at least one managed object/element of the model by an instance of the new association class of the present disclosure. Each instance of the collection class is also associated with at least one instance of the new data source class of the present disclosure. Generally each instance of the data source class is associated with an instance of the collection class by an instance of a second association class.

According to another non-limiting embodiment there is provided an information handling system readable medium having stored thereon a data structure comprising: a first set of data fields wherein each data field contains data representing a managed object of an object-oriented model; a second set of data fields wherein each data field contains data representing an instance of a collection class; a third set of data fields wherein each data field contains data representing an instance of a first association class a fourth set of data fields wherein each data field contains data representing an instance of a data source class; and a fifth set of data fields wherein each data field contains data representing an instance of a second association class. At least one data field of the first set is associated with a data field of the second set by a data field of the third set. Said data field of the second set is also associated with a data field of the fourth set by a data field of the fifth set.

According to another embodiment there is provided an information handling system readable medium having stored thereon instructions that when executed on an information handling system, instruct the information handling system to retrieve information from a cache, and modify said information. Generally the information describes at least one managed object/element of an object-oriented model and is organized by at least one instance of the new collection class of the present disclosure wherein each instance of the collection class is associated with at least one managed object by an instance of the new association class of the present disclosure. Each instance of the collection class is also associated with an instance of the new data source class of the present disclosure by an instance of a second association class.

BRIEF DESCRIPTION OF THE DRAWINGS

The following drawings illustrate some of the many possible embodiments of this disclosure in order to provide a basic understanding of this disclosure. These drawings do not provide an extensive overview of all embodiments of this disclosure. These drawings are not intended to identify key or critical elements of the disclosure or to delineate or otherwise limit the scope of the claims. The following drawings merely present some concepts of the disclosure in a general form. Thus, for a detailed understanding of this disclosure, reference should be made to the following detailed description, taken in conjunction with the accompanying drawings, in which like elements have been given like numerals.

DETAILED DESCRIPTION

For purposes of this disclosure, an embodiment of an Information Handling System (IHS) may include any instrumentality or aggregate of instrumentalities operable to compute, classify, process, transmit, receive, retrieve, originate, switch, store, display, manifest, detect, record, reproduce, handle, or utilize any form of information, intelligence or data for business, scientific, control, or other purposes. For example, an IHS may be a personal computer, a network storage device, or any other suitable device and may vary in size, shape, performance, functionality, and price. The IHS may include random access memory (RAM), one or more processing resources such as a central processing unit (CPU) or hardware or software control logic: ROM, and/or other types of nonvolatile memory. Additional components of the IHS may include one or more disk drives, one or more network ports for communicating with external devices as well as various input and output (I/O) devices, such as a keyboard, a mouse, and a video display. The IHS may also include one or more buses operable to transmit data communications between the various hardware components.

As the capabilities, diversity: and size of computer systems and networks continue to increase, the complexity of system management also increases. Developing and unifying management standards for desktop, enterprise and Internet environments is a main goal of the Distributed Management Task Force, Inc. (DMTF). DMTF standards are platform-independent and technology neutral, and facilitate cost effective system management. The DMTF's Common Information Model (CIM) standard is an object-oriented management information model that unifies and extends existing management standards, such as for example, Simple Network Management Protocol (SNMP), Desktop Management Interface (DMI), and Common Management Information Protocol (CMIP). The CIM specification defines the syntax and rules of the model and how CIM can be integrated with other management models, while the CIM schema comprises the descriptions of the models. The CIM schema currently defines thousands of classes with properties, methods and associations that represent components of a system such as, but not limited to fans power supplies, processors. The classes are organized by namespaces which function as logical databases. DMTF Profiles are specifications that define the CIM model and associated behavior for a management domain. The profiles define requirements regarding the classes and associations used to represent the management information in a given management domain. Generally, within a CIM Object Manager (CIMOM), profiles are implemented by different providers in one or more namespaces.

In a multi-provider implementation situation, an Uber provider, also referred to as the consolidation provider, consolidates CIM instance data from multiple namespaces into an Uber namespace. While consolidating the data, the Uber provider makes its own choices on which CIM data to expose and which CIM data to leave out from the Uber namespace. These choices are typically inherent in the logic of the Uber provider, or are encoded in the external extensible Markup Language (XML) file and thus, the choices are generally made independently from the client.

The methods, apparatus and products of the present disclosure provide flexibility to clients consuming interrelated CIM data from multiple namespaces, and allow the client to customize the source of CIM data in an Uber provider. In non-limiting embodiments, the methods, apparatus and products of the present disclosure provide clients with the ability to identify the source of CIM data in an Uber namespace. In other non-limiting embodiments, the methods, apparatus and products of the present disclosure provide clients with the ability to configure and manipulate the source of CIM data in the Uber namespace. Even other non-limiting embodiments of the methods, apparatus and products of the present disclosure provide extensions to the CIM schema with a new association class, a new collection class, and a new data source class respectively referred to herein as New_AssociatedUberDataSources, New_UberDataSourceCollection, and New_UberDataSource. It should be understood that the names given for these three new CIM classes are merely arbitrary, and that any suitable CIM name may be utilized as a non-limiting name herein. In the practice of the present disclosure, it is not the names of these three new CIM classes which are important, but rather the classes themselves as they are described herein.

Figure 1:
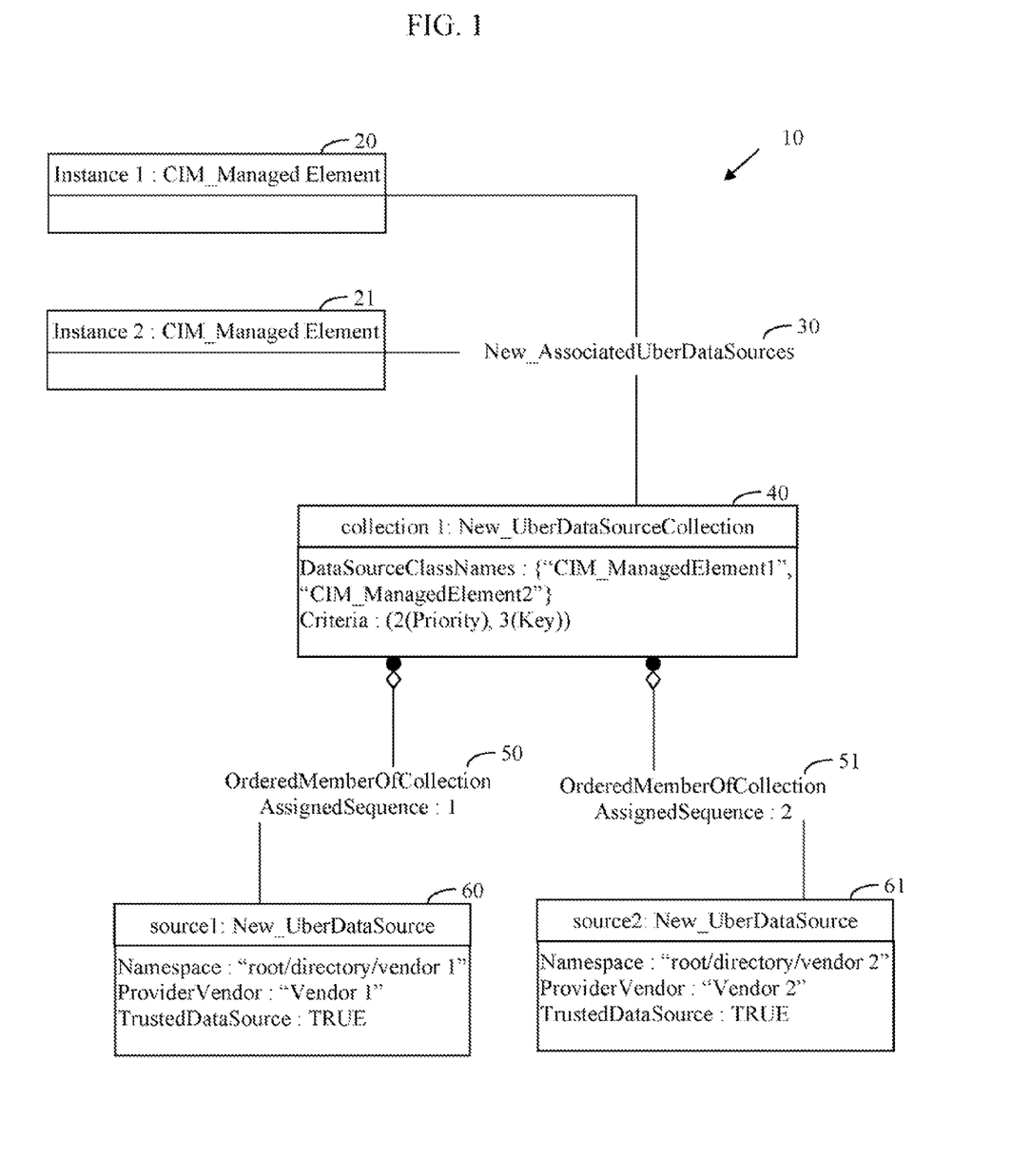
FIG. 1 is a non-limiting graph depicting illustrative instances and relationships of Common Information Model classes.

Referring now to FIG. 1, there is provided graph 10 which depicts non-limiting instances and relationships of the following CIM classes. ClassA, ClassB, New_AssociatedUberDataSources, New_UberDataSourceCollection, CIM_OrderedMemberOfCollection, and New_UberDataSource. The classes New_AssociatedUberDataSources, New_UberDataSourceCollection, and New_UberDataSource are the new CIM classes provided by the present disclosure. CIM_OrderedMemberOfCollection is an existing class, ClassA and ClassB are simply illustrative examples of CIM classes and may be any CIM class, for example any subclass of CIM_ManagedElement.

More specifically in FIG. 1, new CIM class New_AssociatedUberDataSources 30 is an association class. In the non-limiting example depicted in FIG. 1 two instances of the class ClassA are depicted, Instance1:ClassA (Box 20) and Instance2;ClassA (Box 21). New_AssociatedUberDataSources 30 associates each of these instances of ClassA with an instance of New_UberDataSourceCollection, collection1: New_UberDataSourceCollection (Box 40). Instance 1 and Instance 2 of ClassA may be any managed element/object of an object-oriented model, for example but not limited to a fan, a power supply, a sensor, etc. As used herein, ClassA and ClassB are simply illustrative examples of CIM classes, and ClassA and ClassB may be any subclass of CIM_ManagedElement such as but not limited to CIM_Fan, CIM_PowerSupply, CIM_Sensor, etc. Generally, the class New_AssociatedUberDataSources may associate any one or more instances of any one or more subclasses of CIM_ManagedElement with any one or more instances of New_UberDataSourceCollection. Thus, in additional non-limiting embodiments Of the disclosure, an instance of New_AssociatedUberDataSources may associate any one or more subclass of CIM_ManagedElement, new or existing, for example but not limited to CIM_Fan, CIM_PowerSupply, CIM_Sensor to any one or more instances of New_UberDataSourceCollection, such as, for example but not limited to, collection 1, collection 2, collection 3.

Still referring to graph 10 of FIG. 1, existing CIM class CIM_OrderedMemberOfCollection is also an association class. In the non-limiting example depicted in FIG. 1, two instances of CIM_OrderedMemberOfCollection are shown, OrderedMemberOfCollection Assigned Sequence: 1 (indicated by numeral 50), and OrderedMemberOfCollection Assigned Sequence: 2 (indicated by numeral 51). Generally, an instance of association class CIM_OrderedMemberOfCollection may aggregate one or more instances of the class New_UberDataSource with an instance of New_UberDataSourceCollection. It is to be understood that although FIG. 1 depicts the association class CIM_OrderedMemberOfCollection, any applicable association class known in the art may be used to aggregate one or more instances of the class New_UberDataSource with an instance of New_UberDataSourceCollection. In the example shown in FIG. 1, OrderedMemberOfCollection Assigned Sequence; 1 (indicated by numeral 50) associates one instance of New_UberDataSource (Box 60) with collection1:New_UberDataSourceCollection (Box 40), and OrderedMemberOfCollection Assigned Sequence: 2 (indicated by numeral 51) associates a second instance of New_UberDataSource (Box 61) with collection1:New_UberDataSourceCollection (Box 40). In the non-limiting example of FIG. 1, the Instance of New_UberDataSourceCollection is depicted comprising the property DataSourceClassNames having non-limiting values ClassA, and ClassB, and the property Criteria having non-limiting values Priority and Key. The Criteria property may also comprise the value All.

Generally, a non-limiting method of the disclosure for generating data source information for CIM_A comprises finding all the profiles corresponding to CIM_A that are implemented by an Uber provider. As used herein, CIM_A is simply an illustrative example of a CIM class and it should be understood that CIM_A may be any CIM class. Generally, the method may be executed when a request is made to generate data source information. In one non-limiting embodiment, the method may be executed each time a new provider is installed in the CIM environment and classes are registered in the interop namespace. The interop namespace being the namespace that implements profile registering for interoperability. In another non-limiting embodiment, the method may be automatically executed by an Uber provider each time a new provider is installed in a CIM environment and classes are registered in the interop namespace. The method may further comprise forming a list of all the classes that are implemented by all the registered profile instances. For any non-abstract CIM_A class in the list, the method may further comprise checking a designated cache for a representation of an instance of a data source collection class, which covers CIM_A. The cache may be a file written in any language known in the art to be useful for encoding structured information and/or representing data. In one embodiment of the disclosure, the cache is a file written in Extensible Mark-up Language (XML). In another embodiment of the disclosure, the cache is an XML file named CIM Class Data Source Configuration (CCDSC) file. If a representation of an instance of a data source collection class corresponding to CIM_A exists in the cache, the instance path is saved for use in a subsequent step. If there is no representation of an instance of a data source collection class corresponding to CIM_A, one is created using data relevant to CIM_A. In one non-limiting embodiment, the data source collection class is New_UberDataSourceCollection. The method may further comprise enumerating all instances of CIM_RegisteredProfile that correspond to CIM_A from the interop namespace. Each instance of CIM_RegisteredProfile that corresponds to CIM_A is then iteratively selected and the following steps performed, i) find the referencing CIM_ElementConformsToProfile association instance; ii) parse the namespace information from the CIM_ElementConformsToProfile.ManagedElement property, iii) save the value of the namespace and save the trusted data source value. Using the namespace value and the trusted data source value, an instance of New_UberDataSource is created. Generally an instance of CIM_OrderedMemberOfCollection may be used to associate the newly created instance of New_UberDataSource with the newly created instance of New_UberDataSourceCollection. An instance of the New_AssociatedDataSources class may be used to associate each instance of CIM_A instantiated by the Uber provider to the newly created instance of New_UberDataSourceCollection.

Figure 2:
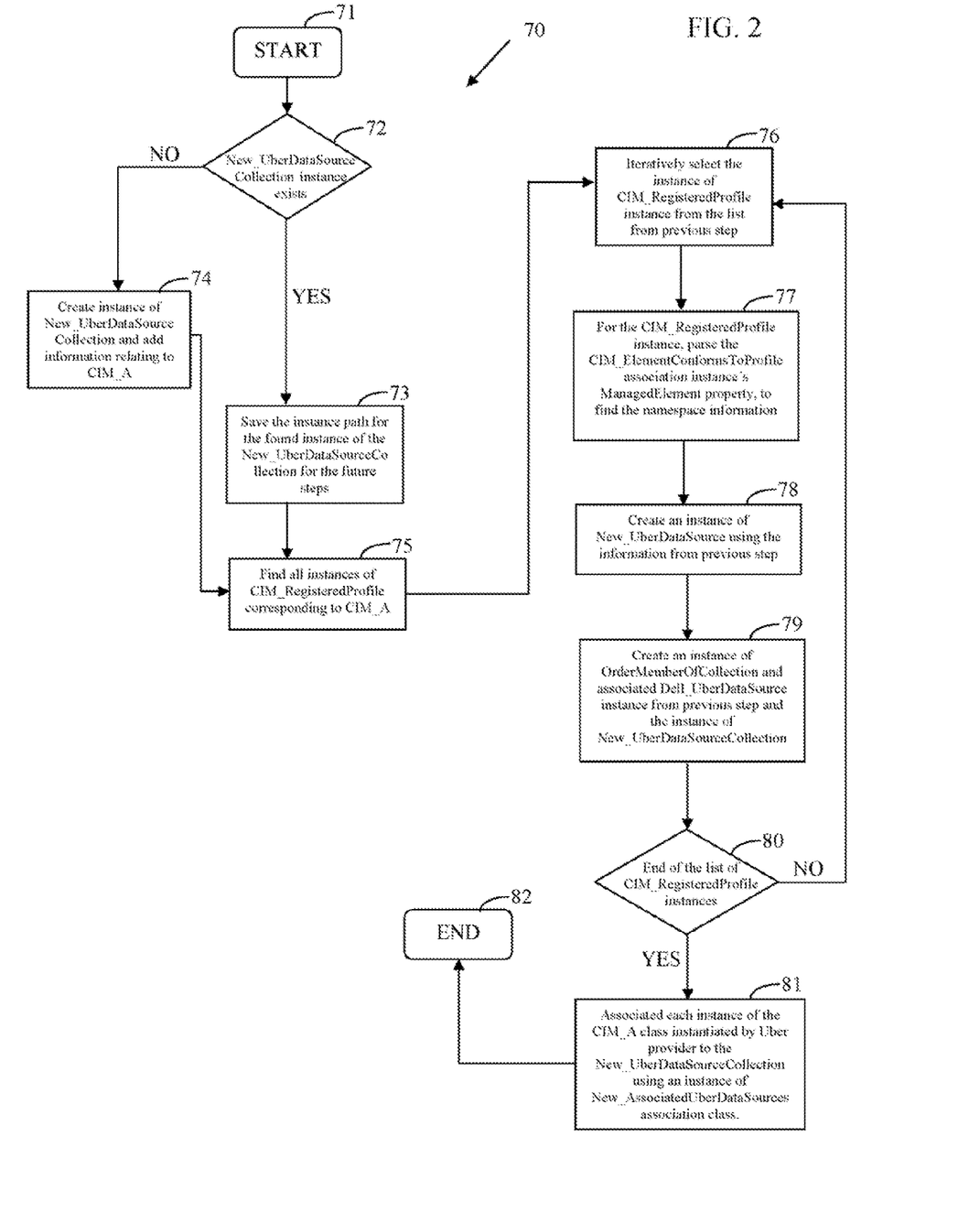
FIG. 2 is a non-limiting flowchart depicting an example method for generating data source information.

Referring now to FIG. 2, non-limiting flowchart 70 depicts an example method for generating data source information. The method starts in step 71 when the Uber provider receives a client request to generate data source information for CIM_A. In step 72, the Uber provider checks a designated cache for a representation of an instance of New_UberDataSourceCollection associated with CIM_A. As described previously, the cache may be a file written in any language known in the art to be useful for encoding structured information and/or representing data. In one non-limiting embodiment of the disclosure, the cache is a file written in Extensible Markup Language (XML). In another non-limiting embodiment of the disclosure, the cache is an XML file named CIM Class Data Source Configuration (CCDSC) file. If an instance is found, the instance path may be saved in step 73 and may be used in future step 79. If no instance of New_UberDataSourceCollection associated with CIM_A exists in the cache, then one may be created in step 74. The instance of New_UberDataSourceCollection for CIM_A is created with a DataSourceClassName property value of "CIM_A" and a Criteria property value of "Priority" in step 74.

In step 75 of FIG. 2, all instances of CIM_RegisteredProfile relating to CIM_A are enumerated from the interop namespace. From this list each instance is iteratively selected in step 76, and subject to steps 77, 78, and 79. Thus, in step 76, the first instance of CIM_RegisteredProfile relating to CIM_A is selected from the list and, in step 77, the referencing CIM_ElementConformsToProfile association instance may be found. Also in step 77, the namespace information may be parsed from the CIM_ElementConformsToProfile association instance's ManagedElement property, which is the reference to the instance of CIM_ComputerSystem in the data source namespace. Generally, the value of the namespace is saved and the TrustedDataSource property value of either "TRUE" or "FALSE" is saved. In step 78 the saved namespace and TrustedDataSource property values may be used to create an instance of New_UberDataSource. In step 79, an instance of the association class CIM_OrderedMemberOfCollection may be created and may associate the instance of New_UberDataSource created in step 78 to the instance of New_UberDataSourceCollection which was either created in step 74, or whose object path was saved in step 73.

In step 80 of the example method depicted by FIG. 2, it is determined whether or not the end of the list of CIM_RegisteredProfile instances (the list created in step 75) has been reached. If it is determined in step 80 that the end of the list has not been reached, then the next instance of the list may be accessed as described in step 76, and steps 77, 78 and 79 executed. If it is determined in step 80 that the end of the list has been reached, then in step 81, each instance of CIM_A instantiated by the Uber provider may be associated to the class New_UberDataSourceCollection using an instance of the class New_AssociatedUberDataSources and the method ends in step 82.

Referring now to both FIGS. 1 and 2, instantiation of the classes shown in the non-limiting example of in FIG. 1 can be described by the non-limiting example method depicted in FIG. 2. For example, the instances of ClassA represented in FIG. 1 by Box 20 and Box 21 are each a non-limiting example of CIM_A referenced throughout FIG. 2. The instance of AssociatedUberDataSources represented in FIG. 1 by numeral 30 is a non-limiting example of an instance of New_AssociatedUberDataSources created in step 79 (FIG. 2). The instance of New_UberDataSourceCollection represented by Box 40 (FIG. 1) is a non-limiting example of an instance of New_UberDataSourceCollection either created in step 74 or whose object path was saved in step 73 (FIG. 2). For the instance of New_UberDataSourceCollection depicted by Box 40 (FIG. 1), the values for the properties DataSourceClassName and Criteria are either obtained in step 74 or step 73. Also in Box 40 (FIG. 1), the values "ClassA" and "ClassB" declared for the property DataSourceClassNames are non-limiting examples, as are the values declared for the property "Criteria". The instance of New_UberDataSource represented in FIG. 1 by Box 60 and the instance represented by Box 61, are each a non-limiting example of an instance of New_UberDataSource created in step 78 (FIG. 2). The non-limiting properties and values for the instances of New_UberDataSource are deduced in step 77. The instances of CIM_OrderedMemberOfCollection "AssignedSequence:1"

and "AssignedSequence:2" depicted by numerals 50 and 51 in FIG. 1, each represent a non-limiting example of an instance of CIM_OrderedMemberOfCollection created in step 79 (FIG. 2).

As further non-limiting embodiments, the present disclosure also provides methods, apparatus and products enabling configuration and modification of CIM data in the Uber namespace. The methods, apparatus and products provide an interface from which modifications to the CIM data can be made. The modifications are generally client-side modifications. Non-limiting examples of modifications that can be made to the CIM data include, but are not limited to, changing the criterion of the namespace selection, changing the priority order of the namespace, and changing the trust level of the data source.

Generally, a non-limiting method of the present disclosure for modifying CIM data source information may be executed when an Uber provider receives a client request to select a CIM_A instance of interest to the client. The Uber provider may select the CIM_A instance by retrieving an instance of a data source collection class associated with the CIM_A instance. Generally, these instances may be stored in a cache. The cache may be a file written in any language known in the art to be useful for encoding structured information and/or representing data. In one non-limiting embodiment of the disclosure, the cache is a file written in Extensible Mark-up Language (XML). In another non-limiting embodiment of the disclosure, the cache is an XML file named CIM Class Data Source Configuration (CCDSC) file. Once the provider has retrieved the instance of the data source collection class associated with the instance of CIM_A of interest, the client is provided an interface from which modifications to the CIM data source information are made. The number of modification choices the interface provides to the client may be any number of categories of data source modification. The client may make any one or more modifications to any one or more property values corresponding to CIM_A data source information. The Uber provider updates the cache for all changes that are made to the data source information.

Figure 3:
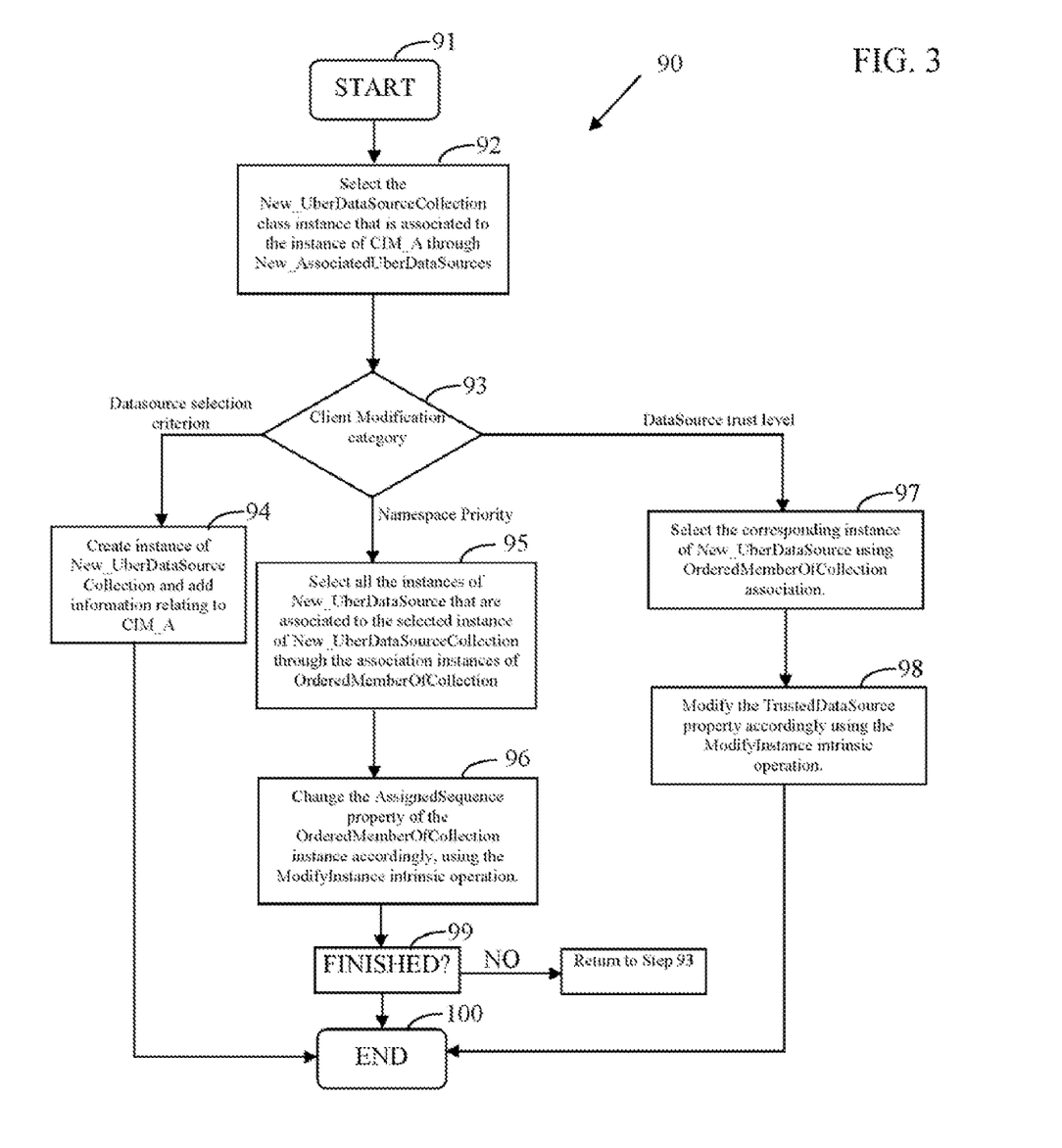
FIG. 3 is a non-limiting flowchart depicting an example method for modifying data sources.

Referring now to FIG. 3, non-limiting flowchart 90 depicts an example method for modifying CIM data source information. In step 91, the method starts when the client sends a request to an Uber provider to select an instance of New_UberDataSourceCollection that is associated to a CIM_A instance of interest to the client. In step 92, the Uber provider may select the instance of New_UberDataSourceCollection that is associated to the instance of CIM_A by the association class New_AssociatedUberDataSources by retrieving it from a cache. As described previously, the cache may be a file written in any language useful for encoding structured information and/or representing data. In one non-limiting embodiment of the disclosure, the cache is a file written in Extensible Mark-up Language (XML). In the present example the cache is an XML file named CIM Class Data Source Configuration (CCDSC) file. In step 93, the client may choose the type of modification he wishes to make by selecting a category of data modification from a number of choices. In the non-limiting example depicted in FIG. 3, the number of categories illustrated is three, 1) data source selection criterion, 2) namespace priority, and 3) data source trust level.

In the example show in FIG. 3, at step 93 if the client wishes to change the data source information, then in step 94 the Criteria property value for the New_UberDataSourceCollection instance (selected in step 92) may be changed according to the client's preference by use of the ModifyInstance intrinsic operation. The Criteria property value may be any applicable value known in the art, such as, for example but not limited to, Priority, Key, All. The Uber provider updates the cache, in this case the CCDSC file, of any changes that are made. If the client has no additional modifications to make, the method ends in step 99.

At step 93 in the example shown in FIG. 3, if the client wishes to change the priority order of the namespaces, then in step 95 all the instances of New_UberDataSource that are associated through instances of the association class CIM_OrderedMemberOfCollection to the New_UberDataSourceCollection instance selected in step 92 may be selected. Generally, the priority order of a namespace is determined by the property value of the "AssignedSequence" property of the instance of CIM_OrderedMemberOfCollection associated with that namespace. In step 96, using the ModifyInstance intrinsic operation, the AssignedSequence property value of the selected CIM_OrderedMemberOfCollection instance may be modified according to the client's preference. The AssignedSequence property value may be any member of the set of non-negative integers {0, 1, 2, 3, . . . , n} wherein n is equal to the total number of instances of New_UberDataSource aggregated to the instance of New_UberDataSourceCollection corresponding to CIM_A. An AssignedSequence property value of 0 is interpreted by the provider as disabling the data source. With the exception of the value 0, generally the value declared for an AssignedSequence property is unique to that particular instance of CIM_OrderedMemberOfCollection such that no two instances have the same AssignedSequence property value.

Still referring to FIG. 3; it the client wishes to change the trust level of a data source, the TrustedDataSource property value for the New_UberDataSource instance corresponding to CIM_A may be modified Thus, in step 97, the instance of New_UberDataSource associated by the association class CIM_OrderedMemberOfCollection to the instance of New_UberDataSourceCollection (selected in step 92) may be selected. In step 98, using the ModifyInstance intrinsic operation, the TrustedDataSource property for the New_UberDataSource instance may be set as either "TRUE" or "FALSE" according to the client's preference. "TRUE" indicates the source is trusted, "FALSE" indicates the source is not trusted.

After making a modification to the data source information, such as a modification made in non-limiting example step 94, step 96, or step 98, if the client is satisfied with the changes made and desires no further modifications, the method ends in step 99.

After making a modification to the data source information, such as a modification made in non-limiting example step 94, step 96, or step 98, the client may choose to make an additional modification to data source information corresponding to the same instance of New_UberDataSourceCollection. In step 99, it may be determined whether the client's modifications are complete. If yes, the modifications are complete, then the method ends in step 100. If the answer to step 99 is no, the modifications are not complete, then the method returns to step 93 and the client may select a modification category. The client may make any one or more modifications, and there is no limit on the number of data modifications that can be made, nor on the number of times a particular value can be modified. For each modification made to the data source information, the Uber provider updates the cache, depicted in FIG. 3 as the CCDSC file, to reflect the changes.

The relationships, classes, class instances, properties, values and files provided in FIGS. 1, 2 and 3 are illustrative and are not intended to limit the scope of the specification and claims of the present disclosure.

Figure 4:
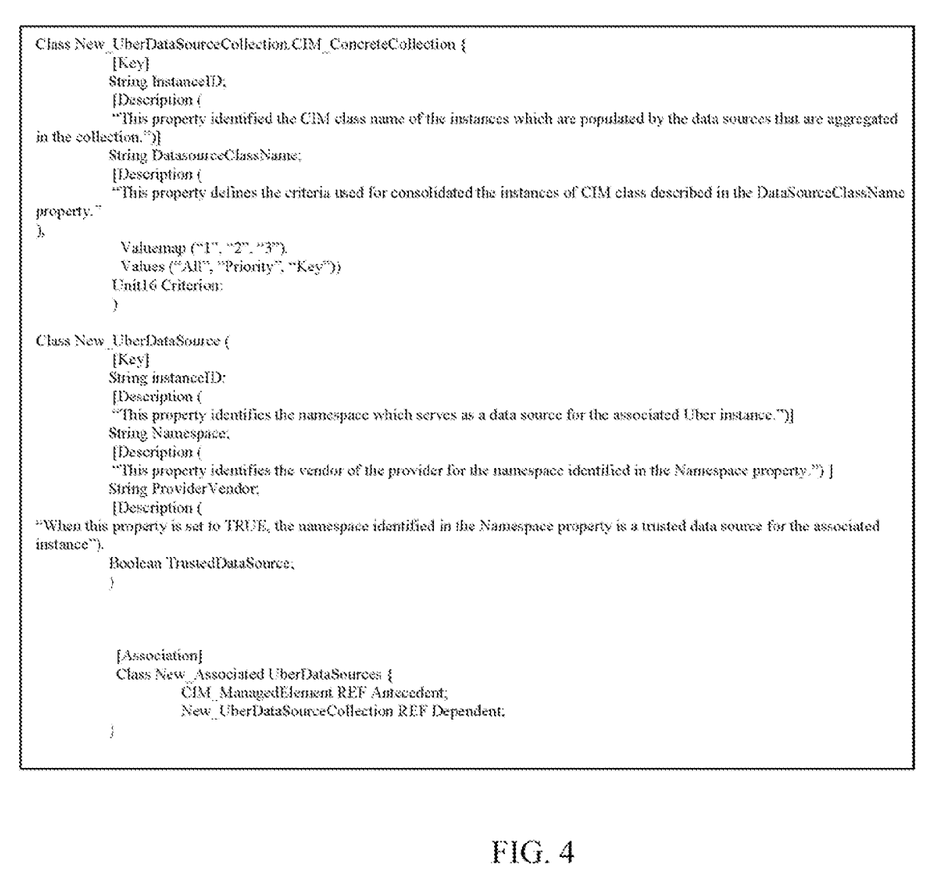
FIG. 4 provides non-limiting Managed Object Format (MOF) text representing illustrative CIM classes New_UberDataSourceCollection, New_UberDataSource, and New_AssociatedUberDataSources.

Referring now to FIG. 4, three new CIM classes of the present disclosure are defined using Managed Object Format (MOF). MOF is known in the art and the information provided in FIG. 4 should be well understood by one of skill in the art. The new classes listed in FIG. 4 are New_UberDataSourceCollection, New_UberDataSource, and New_AssociatedUberDataSources. As stated previously, it should be understood that the names given for these three new CIM classes are merely arbitrary, and that any suitable CIM name may be utilized as a non-limiting name herein. In the practice of the present disclosure, it is not the names of these three new CIM classes that are important, but rather the classes themselves as they are described herein.

As clear to one of skill in the art, in FIG. 4 the class New_UberDataSourceCollection is defined as a subclass of the class CIM_ConcreteCollection, and comprises the properties DataSourceClassName and Criteria. The property DataSourceClassName identifies the CIM class name of the instances, which are populated by the data sources that are aggregated in an instance of New_UberDataSourceCollection. In FIG. 1 the DataSourceClassNames are listed simply as ClassA, ClassB, but it should be understood that these may be any of the subclasses of CIM_ManagedElement for example but not limited to CIM_Fans CIM_PowerSupply. CIM_Sensor, etc. The property Criteria defines the criteria used for consolidating the instances of CIM classes described in the DataSourceClassName property. The values for the Criteria property may be any one or more of All, Priority and Key.

The second class listed in FIG. 4 is New_UberDataSource and comprises the properties Namespace, ProviderVendor, and TrustedDataSource. The property Namespace identifies the namespace which serves as a data source for the associated Uber instance and is generally represented by "root/directory/vendor". The property ProviderVendor identifies the vendor of the provider for the namespace identified in the Namespace property. In FIG. 1 the ProviderVendor is listed simply as "Vendor 1" or "Vendor 2", but it should be understood that the vendor may be any vendor in the art. Non-limiting examples of vendors include but are not limited to Dell, Microsoft, Hewlett Packard IBM, Intel, etc. The property TrustedDataSource defines whether the namespace identified in the Namespace property is a trusted data source for the associated instance. If TrustedDataSource is set to "TRUE", the namespace identified in the Namespace property is a trusted data source for the associated instance. If the property value is set to "FALSE", the namespace identified in the Namespace property is not a trusted data source for the associated instance.

As clear to one of skill in the art, the third class listed in FIG. 4, New_AssociatedUberDataSources, is an association class. As indicated in FIG. 4. New_AssociatedUberDataSources associates the CIM_ManagedElement class with the New_UberDataSourceCollection class.

In non-limiting embodiments, part or all of the data structures described herein may be stored on one or more information handling system readable media or transmitted in a propagated signal. In non-limiting embodiments, part or all of the methods described herein may be described as instructions for an information handling system, and stored on one or more information handling system readable media or transmitted by a propagated signal.

The present disclosure is to be taken as illustrative rather than as limiting the scope or nature of the claims below. Numerous modifications and variations will become apparent to those skilled in the art after studying the disclosure, including use of equivalent functional and/or structural substitutes for elements described herein, use of equivalent functional couplings for couplings described herein, and/or use of equivalent functional actions for actions described herein. Any insubstantial variations are to be considered within the scope of the claims below.

Furthermore, methods of the present disclosure, detailed description and claims may be presented in terms of logic, software or software implemented aspects typically encoded on a variety of storage media or medium including, but not limited to, computer-readable storage medium/media, information handling system storage medium/media, machine-readable storage medium/media, program storage medium/media or computer program product. Such storage media, having computer-executable instructions, may be handled, read, sensed and/or interpreted by an information handling system. Generally, computer-executable instructions, such as program modules, may include routines, programs, objects, components, data structures, and the like, which perform particular tasks, carry out particular methods or implement particular abstract data types. Those skilled in the art will appreciate that such storage media may take various forms such as cards, tapes, magnetic disks (e.g., floppy disk or hard drive) and optical disks (e.g., compact disk read only memory ("CD-ROM") or digital versatile disc ("DVD")). It should be understood that the given implementations are illustrative only and shall not limit the present disclosure.

What is claimed is:

1. A computer-implemented method for modifying information comprising the steps of:
   retrieving the information from a cache, wherein said information describes at least one managed object of an object-oriented model, wherein said information is organized by at least one instance of a collection class, wherein each instance of said collection class is associated with at least one managed object by an instance of a first association class, wherein each instance of said collection class is associated with at least one instance of a data source class, and wherein each instance of said data source class is associated with said instance of said collection class by an instance of a second association class; and
   modifying said information.

2. The method of claim 1 wherein for each managed object said instance of said collection class comprises at least one class name parameter and at least one criteria parameter.

3. The method of claim 1 wherein for each managed object said instance of said data source class comprises a name space parameter, a provider vendor parameter, and a trusted data source parameter.

4. The method of claim 1 wherein for each instance of said data source class said instance of said second association class comprises a priority parameter assigning a unique priority value to said instance of said data source class.

5. The method of claim 1 wherein said modifying includes any change to the information relating to any of said managed object, said collection class, said first association class, said second association class, and said data source class.

6. An information handling system storage readable medium having stored thereon a data structure comprising:
   a first set of data fields wherein each data field contains data representing a managed object of an object-oriented model,
   a second set of data fields wherein each data field contains data representing an instance of a collection class,
   a third set of data fields wherein each data field contains data representing an instance of a first association class, a fourth set of data fields wherein each data field contains data representing an instance of a data source class, a fifth set of data fields wherein each data field contains data representing an instance of a second association class, wherein at least one data field of said first set is associated with a data field of said second set by a data field of said third set, and wherein said first data field of said second set is associated with a data field of said fourth set by a data field of said fifth set.

7. The information handling system readable medium of claim 6 wherein each data field of said second set comprises a managed object name parameter, and a data source criteria parameter.

8. The information handling system readable medium of claim 6 wherein each data field of said fourth set comprises a name space parameter, a provider vendor parameter, and a trusted data source parameter.

9. The information handling system readable medium of claim 6 wherein for each data field of said fourth set a data field of said fifth set comprises a priority parameter assigning a unique priority value to said data field of said fourth set.

10. An information handling system readable medium having stored thereon instructions that when executed on an information handling system, instruct the information handling system to:

retrieve information from a cache, wherein said information describes at least one managed object of an object-oriented model, wherein said information is organized by at least one instance of a collection class, wherein each instance of said collection class is associated with at least one managed object by an instance of a first association class, and wherein each instance of said collection class is associated with an instance of a data source class by an instance of a second association class; and modify said information.

11. The information handling system readable medium of claim 10 wherein each instance of said collection class comprises at least one managed object class name parameter and at least one data source criteria parameter.

12. The information handling system readable medium of claim 10 wherein for each managed object said instance of said data source class comprises a name space parameter, a provider vendor parameter, and a trusted data source parameter.

13. The information handling system readable medium of claim 10 wherein for each instance of said data source class said instance of said second association class comprises a priority parameter assigning a unique priority value to said instance of said data source class.

14. The information handling system readable medium of claim 10 wherein modify includes any change to the information relating to any of said managed object, said collection class, said first association class, said second association class, and said data source class.

* * * * *